(12) United States Patent
Welchko

(10) Patent No.: US 8,339,084 B2
(45) Date of Patent: Dec. 25, 2012

(54) SYSTEMS AND METHODS FOR MONITORING CURRENT IN AN ELECTRIC MOTOR

(75) Inventor: Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 12/723,136

(22) Filed: Mar. 12, 2010

(65) Prior Publication Data

US 2011/0221369 A1    Sep. 15, 2011

(51) Int. Cl.
G05B 5/00  (2006.01)
(52) U.S. Cl. .................. 318/445; 318/438; 318/801
(58) Field of Classification Search .......... 318/445, 318/438, 801, 803, 434, 700, 139, 611, 400.22
See application file for complete search history.

(56) References Cited

U.S. PATENT DOCUMENTS

| | | | |
|---|---|---|---|
| 7,973,499 B2* | 7/2011 | Yoshioka | 318/139 |
| 2007/0007922 A1* | 1/2007 | Sarlioglu et al. | 318/438 |
| 2010/0127648 A1* | 5/2010 | Akiyama | 318/400.11 |

* cited by examiner

Primary Examiner — Karen Masih
(74) Attorney, Agent, or Firm — Ingrassia Fisher & Lorenz, P.C.

(57) ABSTRACT

Systems and methods are provided for monitoring current in an electric motor. An electrical system comprises a direct current (DC) interface, an electric motor, and an inverter module between the DC interface and the electric motor. A first current sensor is configured to measure a DC current flowing between the DC interface and the inverter module. A second current sensor is configured to measure a first phase current flowing through the first phase of the electric motor. A control module is coupled to the current sensors, and the control module is configured to determine an expected value for the first phase current based at least in part on the DC current measured by the first current sensor and take remedial action based on a difference between the expected value and the measured first phase current.

19 Claims, 6 Drawing Sheets

SYSTEMS AND METHODS FOR MONITORING CURRENT IN AN ELECTRIC MOTOR

TECHNICAL FIELD

Embodiments of the subject matter described herein relate generally to electric motor drive systems, and more particularly, embodiments of the subject matter relate to methods and systems for monitoring current in electric motors.

BACKGROUND

In vehicles using electric traction motors, alternating current (AC) motor drives are used to provide a requested torque to the motor shaft. In practice, the amount of torque produced by an electric motor is directly related (although not perfectly proportional) to the amount of current provided to the motor. Therefore, by regulating and precisely controlling the current to the electric motor, the amount of torque produced by the electric motor may be accurately controlled and monitored.

In many systems, the input motor current is not directly controlled. For example, many electric motors are operated using pulse-width modulation (PWM) techniques in combination with an inverter (or another switched-mode power supply) to control the voltage across the motor windings, which in turn, produces current in the motor. In response to a requested torque (or commanded torque), most prior art systems determine a desired input motor current for producing the requested amount of torque and utilize a closed loop control system to control the current through the motor windings and thereby regulate the amount of torque produced by the motor. Current sensors are used to measure the motor current, which is then compared to the desired input motor current. The PWM commands for the inverter are adjusted to increase and/or decrease the voltage across the motor windings, such that the measured motor current tracks the desired input motor current.

When a current sensor does not accurately measure the motor current, the ability of these closed-loop control systems to control the motor torque is impaired. For example, without accurate motor current information, the control system may cause the motor to produce insufficient torque, excessive torque, or varying or oscillating amounts of torque. Accordingly, it is desirable to monitor the current sensors and provide protection in the event a current sensor is not accurately measuring the motor current to ensure reliable operation of the electric motor.

BRIEF SUMMARY

In accordance with one embodiment, an electrical system for use in a vehicle is provided. The electrical system comprises a direct current (DC) interface, an electric motor having a plurality of phases, and an inverter module coupled between the DC interface and the electric motor. The inverter module comprises a plurality of phase legs, wherein each phase leg corresponds to a respective phase of the electric motor. A first current sensor is configured to measure a DC current flowing between the DC interface and the inverter module. A second current sensor is interposed between a first phase leg of the inverter module and a first phase of the electric motor. The second current sensor is configured to measure a first phase current flowing through the first phase of the electric motor. A control module is coupled to the first current sensor and the second current sensor. The control module is configured to determine an expected value for the first phase current based at least in part on the DC current measured by the first current sensor and take remedial action when a difference between the expected value for the first phase current and the measured first phase current is greater than a threshold value.

In accordance with another embodiment, a method is provided for operating an electrical system including an inverter coupled between a direct current (DC) interface and an electric motor. The method comprises measuring DC current flowing between the DC interface and the inverter, measuring a first phase current flowing between the inverter and a first phase of the electric motor, determining an expected first phase current based on the measured DC current, and taking remedial action when a difference between the measured first phase current and the expected first phase current is greater than a threshold value.

In another embodiment, an electrical system is provided. The electrical system comprises a direct current (DC) interface, an electric motor having a plurality of phases, and an inverter module coupled between the DC interface and the electric motor. The inverter module comprises a plurality of phase legs wherein each phase leg corresponds to a phase of the electric motor. A first current sensor is interposed between the DC interface and the inverter module. The first current sensor is configured to measure a DC current flowing between the DC interface to the inverter module. A second current sensor is interposed between a first phase leg of the inverter module and a first phase of the electric motor. The second current sensor is configured to measure a first phase current flowing through the first phase of the electric motor. A third current sensor is interposed between a second phase leg of the inverter module and a second phase of the electric motor. The third current sensor is configured to measure a second phase current flowing through the second phase of the electric motor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
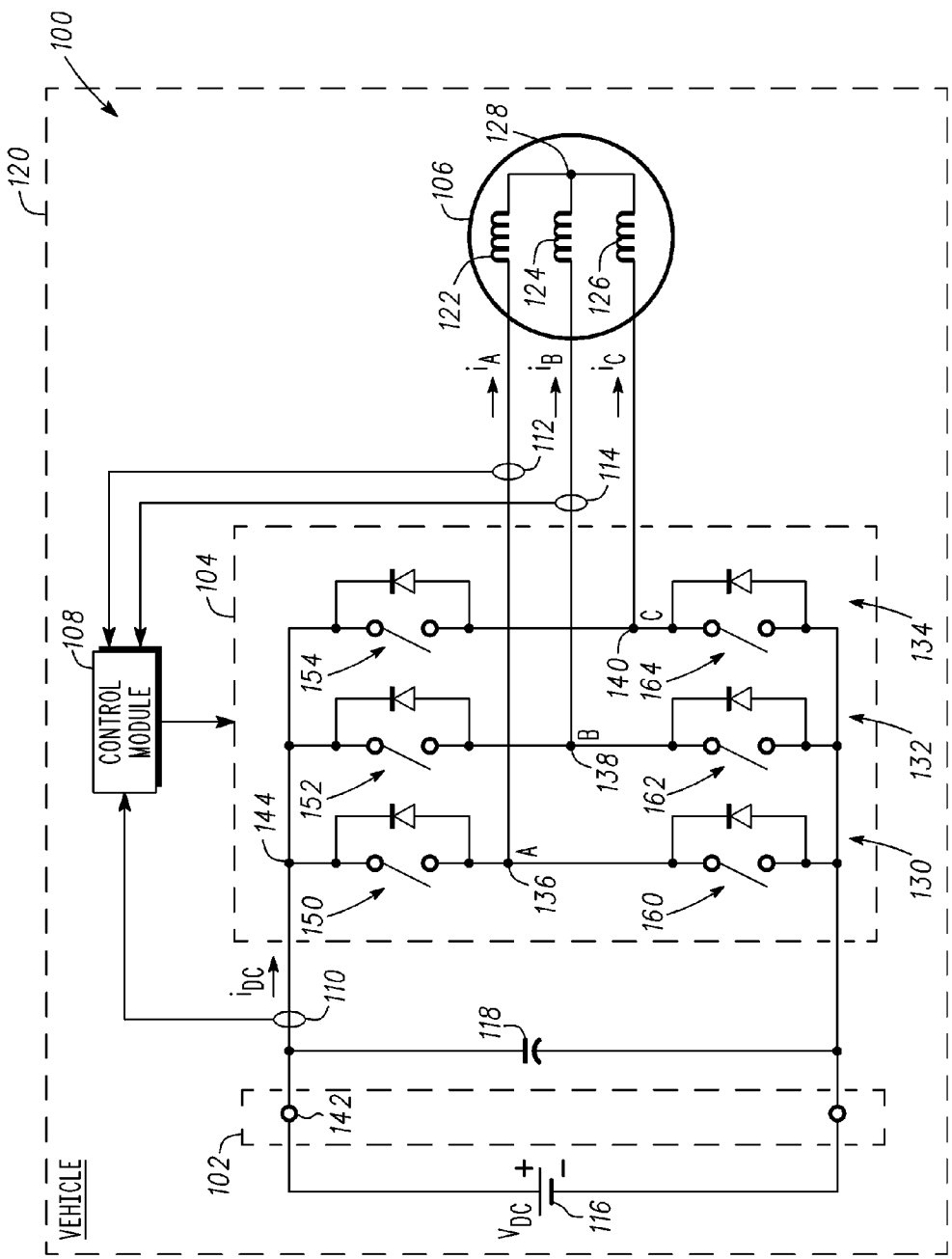
FIG. 1 is a schematic view of an electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Technologies and concepts discussed herein relate generally to systems and/or methods for monitoring current sensors used to control an inverter and/or electric motor in an electrical system in a vehicle. As described in greater detail below, a current sensor is used to measure a direct current (DC) current flowing to/from the inverter, and the measured values obtained by the current sensor are used to determine expected values for the phase currents of the electric motor, which are then compared to measured values for the phase currents obtained by phase current sensors. In this regard, a difference between the expected value and measured value that is greater than a threshold value is indicative of an error condition within the electrical system. In this regard, an error condition may be a current sensor that is not accurately measuring current or a fault condition. In response to identifying an error condition (e.g., when the difference between the expected value and measured value is greater than the threshold value), remedial action is taken to ensure safe and reliable operation of the electric motor. Additionally, a zero vector current may be determined based on the measured value(s) of the DC current and analyzed to determine or otherwise identify the presence of a fault condition.

FIG. 1 depicts an exemplary embodiment of an electrical system 100 suitable for use in a vehicle 120, such as, for example, an electric and/or hybrid vehicle. The electrical system 100 includes, without limitation, a DC interface 102, a power inverter module 104, an electric motor 106, a control module 108, and a plurality of current sensors 110, 112, 114. The DC interface 102 generally represents the physical interface (e.g., terminals, connectors, and the like) for coupling the electrical system 100 to a DC energy source 116. In an exemplary embodiment, the control module 108 operates the inverter module 104 based at least in part on the measured values for the phase currents of the electric motor 106 obtained by current sensors 112, 114 to achieve a desired power flow between the DC energy source 116 and the electric motor 106, as described in greater detail below.

In an exemplary embodiment, a first current sensor 110 is interposed or otherwise arranged between the DC interface 102 and the inverter module 104 and configured to measure current ($i_{DC}$) flowing to/from the inverter module 104. The second current sensor 112 is interposed or otherwise arranged between the inverter module 104 and the electric motor 106 and configured to measure a phase current for a first phase of the electric motor 106, and the third current sensor 114 is interposed or otherwise arranged between the inverter module 104 and the electric motor 106 and configured to measure a phase current for a second phase of the electric motor 106. Accordingly, for convenience, the first current sensor 110 may be referred to herein as the DC current sensor and the second and third current sensors 112, 114 may be referred to herein as the phase current sensors.

In an exemplary embodiment, the control module 108 is coupled to the current sensors 110, 112, 114, and the control module 108 is configured to monitor and validate or otherwise verify the measured current values obtained by the current sensors 110, 112, 114 are sufficiently accurate, thereby ensuring the current sensors 110, 112, 114 are functioning properly (e.g., within a predetermined tolerance). As described in greater detail below, the control module 108 verifies the accuracy of the measured current values based on the relationship between phase currents measured by phase current sensors 112, 114 and the DC current measured by the DC current sensor 110.

The vehicle 120 is preferably realized as an automobile, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 120 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, in addition to the electric motor 106.

In an exemplary embodiment, the DC energy source 116 (or alternatively, the energy storage source or ESS) is capable of providing and/or receiving a direct current ($i_{DC}$) to the electrical system 100 at a particular DC voltage level ($V_{DC}$). Depending on the embodiment, the energy source 116 may be realized as a battery, a fuel cell (or fuel cell stack), an ultracapacitor, a controlled generator output, or another suitable voltage source. The battery may be any type of battery suitable for use in a desired application, such as a lead acid battery, a lithium-ion battery, a nickel-metal battery, a rechargeable high-voltage battery pack, or another suitable energy storage element. In an exemplary embodiment, the DC energy source 116 has a nominal DC voltage range from about 200 to about 500 Volts DC. As shown, the electrical system 100 may include a capacitor 118 (alternatively referred to as a DC link capacitor or bulk capacitor) coupled between the DC interface 102 and the inverter module 104 and configured electrically parallel to the DC energy source 116 to reduce voltage ripple at the DC interface 102 and/or DC energy source 116, as will be appreciated in the art.

In an exemplary embodiment, the electric motor 106 is realized as a multi-phase alternating current (AC) motor and includes a set of windings (or coils), wherein each winding corresponds to a phase of the motor 106. In the illustrated embodiment of FIG. 1, the motor 106 is realized as a three-phase AC motor having a three-phase set of windings including a first (e.g., phase A) winding 122, a second (e.g., phase B) winding 124, and a third (e.g., phase C) winding 126. It should be understood that the labeling of phases A, B, and C is for ease of description and is not intended to limit the subject matter in any way. In an exemplary embodiment, the windings 122, 124, 126 are configured in a wye-connection, wherein an end of each winding is connected to ends of the other windings at a common node. For example, as shown in FIG. 1, the windings 122, 124, 126 are connected and/or terminate at a common node 128. The motor 106 may be an induction motor, a permanent magnet motor, or any type suitable for the desired application. Although not illustrated, the motor 106 may also include a transmission integrated therein such that the motor 106 and the transmission are mechanically coupled to at least some of the wheels of the vehicle 120 through one or more drive shafts. Additionally, the motor 106 may include a stator assembly (including the coils), a rotor assembly (including a ferromagnetic core), and a cooling fluid (i.e., coolant), as will be appreciated by one skilled in the art. It should be understood that although the electrical system 100 is described herein in the context of a three-phase motor, the subject matter described herein is not intended to be limited to three-phase motors.

In the illustrated embodiment, the power inverter module 104 includes six switching elements 150, 152, 154, 160, 162, 164 (e.g., semiconductor devices, such as transistors and/or switches) with antiparallel diodes (i.e., diodes which are antiparallel to each switch). In this regard, each switch and diode are configured electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 116 for charging the DC energy source 116 when the respective switch is off. Preferably, the switches are realized using insulated-gate bipolar transistors (IGBTs), however, in alternative embodiments, the switches may be realized as field-effect transistors (e.g., a MOSFET) or another switching device known in the art.

As shown, the switches in the inverter module 104 are arranged into three phase legs (or pairs) 130, 132, 134, with each phase leg 130, 132, 134 being coupled to a respective end of the windings 122, 124, 126. In this regard, a node 136 between the switches 150, 160 of phase leg 130 is coupled to the phase A winding 122, a node 138 between the switches 152, 162 of phase leg 132 is coupled to the phase B winding 124, and a node 140 between the switches 154, 164 of phase leg 132 is coupled to the phase C winding 126. Thus, phase leg 130 may be referred to as the phase A leg, phase leg 132 the phase B leg, and phase leg 134 the phase C leg. The phase current sensors 112, 114 are each arranged between a phase leg 130, 132 of the inverter module 104 and its corresponding winding 122, 124 such that each phase current sensor 112, 114 measures, senses, or otherwise obtains values for a phase current flowing from/to the inverter module 104 to/from the electric motor 106. For example, as shown, the first phase current sensor 112 is arranged or otherwise interposed between node 136 of phase leg 130 and winding 122 and measures the phase A motor current ($i_A$), and the second phase current sensor 114 is arranged or otherwise interposed between node 138 of phase leg 132 and winding 124 and measures the phase B motor current ($i_B$). It should be noted that although FIG. 1 depicts the phase current sensors 112, 114 arranged to measure the phase A and B motor currents for purpose of explanation, in alternative embodiments, the phase current sensors 112, 114 may be arranged to measure the phase A and C motor currents or the phase B and C motor currents.

In an exemplary embodiment, the DC current sensor 110 is arranged between a node 142 of the DC interface 102 (e.g., the node configured to be coupled to a positive terminal of DC energy source 116) and the phase legs 130, 132, 134 of the inverter module 104 at node 144 such that the DC current sensor 110 measures, senses, or otherwise obtains value(s) of the DC current ($i_{DC}$) that flows from the DC energy source 116 to the windings 122, 124, 126 of the electric motor 106 via the phase legs 130, 132, 134 of the inverter module 104. As described in greater detail below, in an exemplary embodiment, the control module 108 obtains measured values of the DC current from the DC current sensor 110 asynchronously during a switching interval (or PWM cycle), such that each voltage vector implemented and/or applied by the inverter module 104 during the switching interval has a corresponding measured value of the DC current obtained while the respective voltage vector was applied to the electric motor 106.

The control module 108 generally represents the hardware, firmware and/or software configured to operate and/or modulate the switches 150, 152, 154, 160, 162, 164 of the inverter module 104 to achieve a desired power flow between the DC energy source 116 and the electric motor 106. In an exemplary embodiment, the control module 108 is in operable communication and/or electrically coupled to the inverter module 104 and the current sensors 110, 112, 114. The control module 108 is responsive to commands received from the driver of the vehicle 120 (e.g., via an accelerator pedal) and provides a command to the inverter module 104 to control the output of the inverter phase legs 130, 132, 134. In an exemplary embodiment, the control module 108 is configured to modulate and control the inverter module 104 using high frequency pulse width modulation (PWM), as described below. The control module 108 provides PWM command signals to operate (e.g., open and/or close) the switches 150, 152, 154, 160, 162, 164 of the inverter phase legs 130, 132, 134 to cause output voltages to be applied across the windings 122, 124, 126 within the motor 106, which, in turn, produces current(s) through the windings 122, 124, 126 of the motor 106 to operate the motor 106 with the commanded torque. In an exemplary embodiment, the control module 108 implements closed-loop current-based (or current-regulated) control of the motor 106, wherein the PWM signals are determined or otherwise adjusted based on differences between the motor phase currents measured by phase current sensors 112, 114 and desired (or commanded) motor phase currents.

Depending on the embodiment, the control module 108 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. Although not illustrated, the control module 108 may generate current and/or voltage commands for the phases of the motor 106 in response to receiving a torque command from an electronic control unit (ECU), system controller, or another control module within the vehicle 120. Further, in some embodiments, the control module 108 may be integral with an ECU or another vehicle control module.

As described in greater detail below, in an exemplary embodiment, the control module 108 monitors the measured values obtained by the current sensors 110, 112, 114 to ensure the current sensors 110, 112, 114 are functioning properly based on the relationship between the phase currents measured by phase current sensors 112, 114 and the DC current measured by the DC current sensor 110. In this regard, in an exemplary embodiment, the control module 108 determines expected motor phase currents based on the measured DC current ($i_{DC}$) and the state of the inverter phase legs 130, 132, 134 at the time the measured DC current ($i_{DC}$) was obtained. When the difference between an expected motor phase current and a measured motor phase current exceeds a threshold value (e.g., a predetermined tolerance), the control module 108 determines an error condition exists within the electrical system 100 and initiates a remedial action, as described in greater detail below.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

Figures 2, 4:
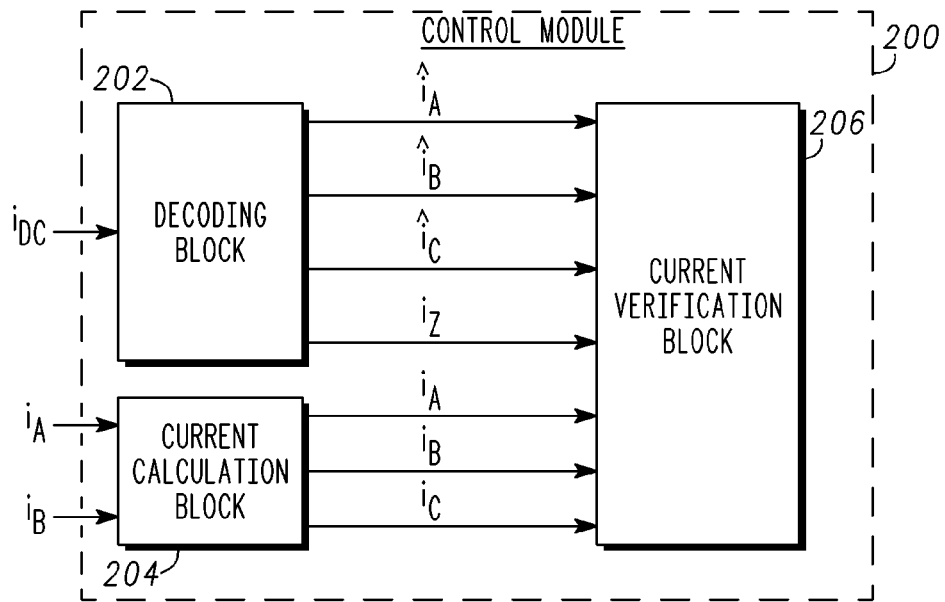
FIG. 2 is a block diagram of a control module suitable for use in the electrical system of FIG. 1 in accordance with one embodiment.
FIG. 4 is a table illustrating the relationship between DC current flowing to an inverter module and the motor phase current based on a voltage vector applied by the inverter module for a three-phase electric motor suitable for use with the control process of FIG. 3 in accordance with one embodiment.

FIG. 2 depicts an exemplary embodiment of a control module 200 suitable for use as control module 108 in the electrical system 100 of FIG. 1. The control module 200 includes, without limitation, a decoding block 202, a current calculation block 204, and a current verification block 206. For each PWM cycle (or switching interval), the decoding block 202 determines a decoded value (or secondary value) for the phase currents of the electric motor 106 and a zero vector current. As described in greater detail below, a decoded value (or secondary value) for a particular current corresponds to a value for that particular current that is determined based upon a measured value of the DC current. In this regard, the decoding block 202 determines an expected value for the phase A motor current ($\hat{i}_A$), an expected value for the phase B motor current ($\hat{i}_B$), an expected value for the phase C motor current ($\hat{i}_C$), and a measured value for the zero vector motor current ($i_Z$) based on the state(s) of the inverter phase legs 130, 132, 134 during the switching interval when the measured value(s) for the DC current ($i_{DC}$) is obtained. The current calculation block 204 calculates a measured value for a third motor phase current using measured values for the other two motor phase currents based on Kirchoff's current law. In this regard, for a wye-connected electric motor, the motor phase currents sum to zero (e.g., $i_A + i_B + i_C = 0$). Thus, in the illustrated embodiment, the current calculation block 204 calculates a measured phase C motor current ($i_C$) based on the measured values for phases A and B (e.g., $i_C = -i_A - i_B$).

As described in greater detail below, the current verification block 206 compares the measured motor phase currents from the current calculation block 204 to the expected motor phase current values from the decoding block 202 to verify the difference between the measured motor phase currents and the expected motor phase currents is less than a threshold value. Additionally, the current verification block 206 determines whether the zero vector current exceeds a threshold value indicative of a fault condition that may not otherwise be detectable using measured phase currents obtained from phase current sensors 112, 114.

Figure 3:
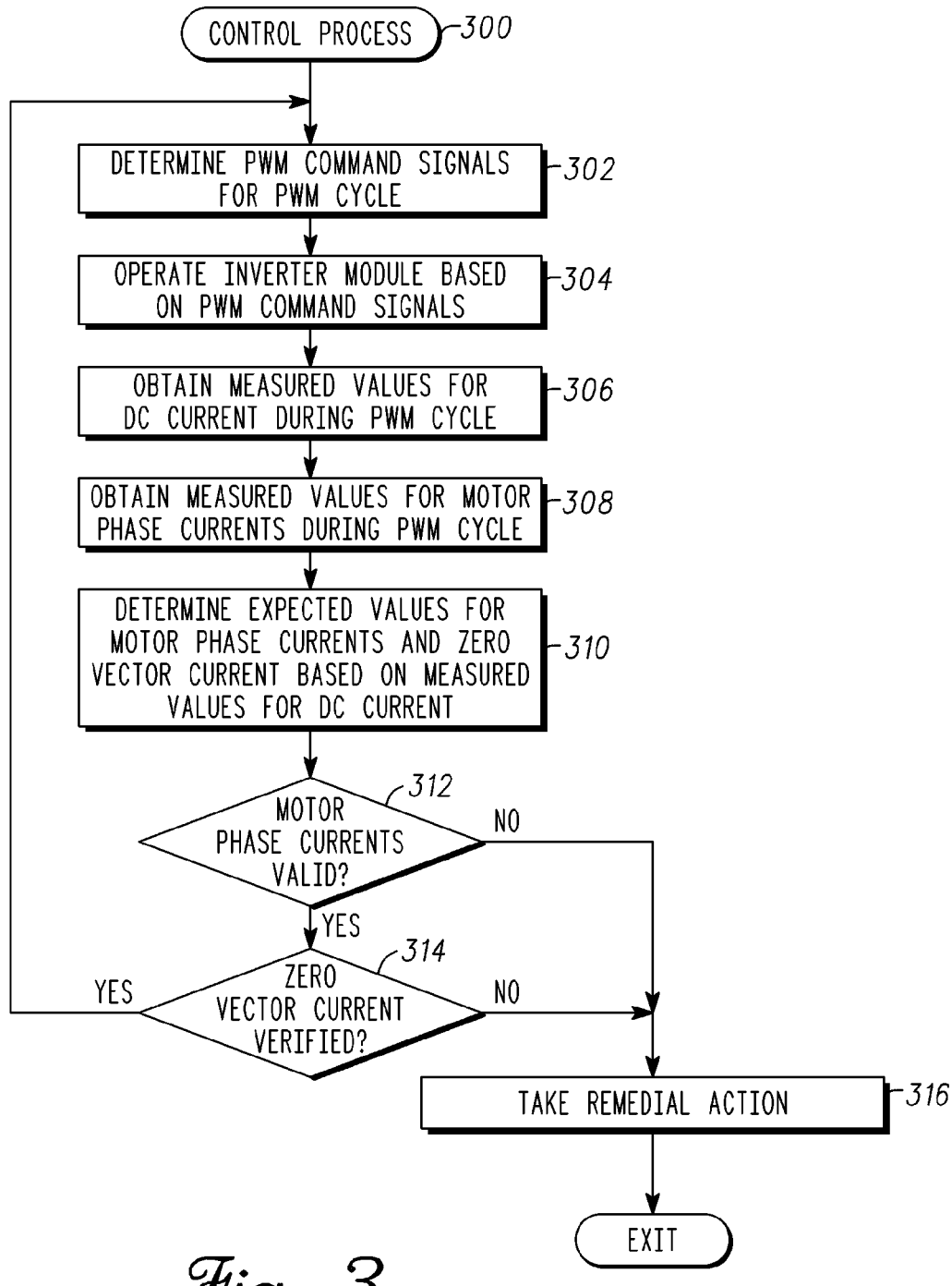
FIG. 3 is a flow diagram of a control process suitable for use with the electrical system of FIG. 1 in accordance with one embodiment.

Referring now to FIG. 3, in an exemplary embodiment, an electrical system may be configured to perform a control process 300 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the inverter module 104, the current sensors 110, 112, 114, the control module 108, 200, the decoding block 202, the current calculation block 204 and/or the current verification block 206. It should be appreciated that any number of additional or alternative tasks may be included, and may be incorporated into a more comprehensive procedure or process having additional functionality not described in detail herein.

Referring to FIG. 3, and with continued reference to FIG. 1 and FIG. 2, a control process 300 may be performed to enable closed-loop current-controlled operation of an electric motor using an inverter module while also verifying that the current sensors used for the closed-loop current control are measuring current accurately and/or providing protection from a fault condition that may exist within the electrical system. The control process 300 initializes or begins by determining PWM command signals for the inverter module for a PWM cycle (or switching interval) and operating the inverter module in accordance with the PWM command signals during the PWM cycle (tasks 302, 304). For example, the control module 108 may obtain a torque command (e.g., from an ECU, system controller, or another control module within the vehicle 120) and determine current commands for the electric motor 106 based on the torque command. Based on a difference between the current commands and the measured motor phase currents from phase current sensors 112, 114, the control module 108 generates PWM command signals for the phase legs 130, 132, 134 of the inverter 104 to produce the commanded current, and thus, the commanded torque, in the electric motor 106. In an exemplary embodiment, the control module 108 determines voltage commands for producing the commanded current and determines PWM command signals for the phase legs 130, 132, 134 of the inverter 104 based on the voltage commands. The control module 108 modulates (e.g., opens and/or closes) the switches of the phase legs 130, 132, 134 during the PWM cycle based on the PWM command signals, which results in one or more voltage vectors being applied by the inverter module 104 to the electric motor 106 during the PWM cycle such that the effective AC voltages across the corresponding phases of the windings 122, 124, 126 are substantially equal (within practical and/or realistic operating tolerances) to the voltage commands, as will be appreciated in the art.

In an exemplary embodiment, the control process 300 continues by obtaining measured values for the DC current flowing through to the inverter module and the motor phase currents during the PWM cycle (tasks 306, 308). In an exemplary embodiment, the control module 108 obtains a measured value for the DC current ($i_{DC}$) from the DC current sensor 110 each time a different voltage vector is applied to the electric motor 106. In this regard, the control module 108 may asynchronously read (or sample) a measured value of the DC current ($i_{DC}$) from the DC current sensor 110 each time the control module 108 operates the inverter module 104 to change the voltage vector being applied to the electric motor 106. In other words, the control module 108 obtains a measured value of the DC current ($i_{DC}$) from the DC current sensor 110 each time the state of one or more switches of the phase legs 130, 132, 134 are changed during the PWM cycle. For example, in a PWM cycle, the inverter module 104 may implement and/or apply two active vectors (or non-zero vectors) and a zero vector, resulting in three measured values of the DC current during that PWM cycle. In an exemplary embodiment, the control module 108 stores the measured values of the DC current ($i_{DC}$) for the PWM cycle and maintains an association between each measured value of the DC current ($i_{DC}$) and the state of the switches of the phase legs 130, 132, 134 at the time the DC current sensor 110 was read and/or sampled to obtained the respective measured value (e.g., the voltage vector at the time the respective measured value was obtained).

In an exemplary embodiment, the control module 108 obtains measured values for the motor phase currents from the phase current sensors 112, 114 at a particular time during the PWM cycle. In an exemplary embodiment, the measured values of the motor phase currents are obtained and/or measured simultaneously at an instant of the PWM cycle which would yield the average current of the PWM cycle to facilitate higher quality current control. For example, in practice, the control module 108 may simultaneously and/or concurrently read (or sample) the phase current sensors 112, 114 at the beginning of the PWM cycle. In alternative embodiments, the control module 108 may obtain measured values for the motor phase currents from the phase current sensors 112, 114 at the middle of the PWM cycle, the end of the PWM cycle, at some other instant during the PWM cycle, or at different times (i.e., not simultaneously) during the PWM cycle. In other embodiments, the control module 108 may obtain measured values for the motor phase currents by reading (or sampling) the phase current sensors 112, 114 at the same time as (or in sync with) reading (or sampling) the DC current sensor 110.

In an exemplary embodiment, the control process 300 continues by determining decoded current values based on the measured values for the DC current during the PWM cycle (task 310). In this regard, the control module 108, 200 and/or decoding block 202 determines expected values for the motor phase currents by mapping each measured value of the DC current ($i_{DC}$) to a particular motor phase current based on the state of the switches of the phase legs 130, 132, 134 at the time the DC current sensor 110 was read and/or sampled to obtained the respective measured value. Additionally, in an exemplary embodiment, the control module 108, 200 and/or decoding block 202 determines a zero vector current based on measured value of the DC current ($i_{DC}$) obtained when a zero voltage vector was being applied and/or implemented by the control module 108, 200 in a similar manner.

FIG. 4 depicts a table 400 illustrating the relationship between the DC current flowing to the inverter module 104 and the resulting motor phase current based on the voltage vector being implemented by the inverter module 104. A value of '0' in a voltage vector indicates that the lower switch of the phase leg corresponding to the respective digit is closed and the upper switch of the phase leg corresponding to the respective digit is opened, while a value of '1' in a voltage vector indicates that the lower switch of the phase leg corresponding to the respective digit is opened and the upper switch of the phase leg corresponding to the respective digit is closed. For example, voltage vector $V_0$ corresponds to switches 160, 162 and 164 being closed and switches 150, 152 and 154 being opened, voltage vector $V_1$ corresponds to switches 150, 162 and 164 being closed and switches 160, 152 and 154 being opened, voltage vector $V_2$ corresponds to switches 150, 152 and 164 being closed and switches 160, 162 and 154 being opened, and so on.

As shown in FIG. 4, the DC current ($i_{DC}$) is theoretically equal to the phase A motor current ($i_A$) when the voltage vector applied and/or implemented by the inverter module 104 corresponds to voltage vector $V_1$, the phase B motor current ($i_B$) when the voltage vector corresponds to voltage vector $V_3$, and the phase C motor current ($i_C$) when the voltage vector corresponds to voltage vector $V_5$. Conversely, the negative of the DC current ($i_{DC}$) is theoretically equal to the phase A motor current ($i_A$) when the voltage vector applied and/or implemented by the inverter module 104 corresponds to voltage vector $V_4$, the phase B motor current ($i_B$) when the voltage vector corresponds to voltage vector $V_6$, and the phase C motor current ($i_C$) when the voltage vector corresponds to voltage vector $V_2$. In this regard, any measured value(s) of the DC current obtained when either voltage vector $V_1$ or voltage vector $V_4$ was applied corresponds to the phase A motor current, any measured value(s) of the DC current obtained when either voltage vector $V_3$ or voltage vector $V_6$ was applied corresponds to the phase B motor current, and any measured value(s) of the DC current obtained when either voltage vector $V_2$ or voltage vector $V_5$ was applied corresponds to the phase C motor current. As shown, when the voltage vector applied and/or implemented by the inverter module 104 corresponds to a zero voltage vector (e.g., $V_0$ or $V_7$), the DC current ($i_{DC}$) corresponds to the zero vector current ($i_Z$).

Referring again to FIG. 3 and with continued reference to FIGS. 1-2 and 4, in an exemplary embodiment, the control module 108, 200 and/or decoding block 202 determines decoded current values (e.g., expected values for the motor phase currents or zero vector current values) by utilizing table 400 to map each measured value of the DC current ($i_{DC}$) to a particular motor phase current or the zero vector current based on the state of the switches of the phase legs 130, 132, 134 at the time the respective measured value was obtained. For example, the control module 108, 200 and/or decoding block 202 may determine an expected value for the phase A motor current ($\hat{i}_A$) as a measured value of the DC current ($i_{DC}$) obtained when voltage vector $V_1$ was applied or as the negative of a measured value of the DC current ($i_{DC}$) obtained when voltage vector $V_4$ was applied. An expected value for the phase B motor current ($\hat{i}_B$) may be determined as a measured value of the DC current ($i_{DC}$) obtained when voltage vector $V_3$ was applied or as the negative of a measured value of the DC current ($i_{DC}$) obtained when voltage vector $V_6$ was applied. An expected value for the phase C motor current ($\hat{i}_C$) may be determined as a measured value of the DC current obtained when voltage vector $V_5$ was applied or as the negative of a measured value of the DC current obtained when voltage vector $V_2$ was applied. The value for the zero vector motor current ($i_Z$) may be determined as a measured value of the DC current obtained when either voltage vector $V_0$ or voltage vector $V_7$ was applied.

In an exemplary embodiment, if more than one measured value of the DC current corresponds to a particular motor phase current, the measured values corresponding to the same motor phase current may be averaged to determine the expected value for that motor phase current. For example, the control module 108, 200 and/or decoding block 202 may determine the expected value for the phase A motor current ($\hat{i}_A$) for a PWM cycle by averaging any measured values of the DC current obtained when voltage vector $V_1$ was applied during the PWM cycle and the negatives of any measured values of the DC current obtained when voltage vector $V_4$ was applied during the PWM cycle. As described in greater detail below, in accordance with one or more embodiments, if the control module 108, 200 and/or decoding block 202 is unable to determine decoded value for a particular current (e.g., an expected value for a motor phase current or zero vector current) after a predetermined amount of time, the control module 108, 200 may generate modified PWM command signals for an upcoming PWM cycle that will enable the control module 108, 200 and/or decoding block 202 to determine a decoded value for the respective current.

In an exemplary embodiment, the control process 300 continues by validating or otherwise verifying the measured values obtained for the motor phase currents based on the expected values for the motor phase currents (task 312). In this regard, the control process 300 compares the expected value for each motor phase current to the measured value for the respective motor phase current to determine or otherwise detect when a difference between the measured value and the expected value for the respective phase of the motor exceeds a threshold value. In an exemplary embodiment, the control module 108, 200 and/or current verification block 206 performs a monitoring process 500 as described in greater detail below in the context of FIG. 5.

When a measured value for a particular phase current is not within the threshold value of its expected value, the control process 300 determines an error condition exists in the electrical system and continues by taking a remedial action and/or other measures to ensure safe and effective operation of the electric motor (task 316). For example, in accordance with one embodiment, the control module 108 may disable the current-controlled operation of the electric motor and provide appropriate PWM command signals to safely bring the electric motor 106 to a stop. In other embodiments, the control module 108 may control the voltage and/or current provided to the electric motor 106 in a manner that causes the torque produced by the electric motor 106 to roughly track the torque command without reliance on current sensors 112, 114. In some embodiments, the control module 108 may limit the voltage and/or current provided to the electric motor 106. In addition, the control module 108 may be configured to take additional remedial measures, such as, for example, providing notification of a current sensor error to an ECU or another supervisory control system or component of the electrical system 100 which causes an audible and/or visual warning to be generated in the vehicle 120 (e.g., turning on the check engine light). It should be appreciated that any number of remedial actions and various combinations thereof may be utilized in any practical embodiment.

In an exemplary embodiment, when differences between the measured values and the expected values for the phase currents of the motor are all less than a threshold value, the control process 300 continues by verifying the zero vector current to determine or otherwise detect when the zero vector current exceeds the threshold value (task 314). In the absence of a fault condition, the zero vector current ($i_Z$) is substantially equal to zero, and thus, the expected value of the zero vector current is equal to zero (e.g., $\hat{i}_Z=0$). In this regard, the control module 108, 200 and/or current verification block 206 performs a monitoring process 500 as described in greater detail below in the context of FIG. 5 to detect or otherwise identify a fault condition when the measured value for the zero vector current is greater than the threshold value. In response to detecting a fault condition, the control process 300 takes one or more remedial actions in a similar manner as described above. The loop defined by tasks 302, 304, 306, 308, 310, 312 and 314 may repeat as desired throughout operation of an electrical system as long as the differences between the measured values and the expected values for the motor phase currents are less than a threshold value and the zero vector current is less than a threshold value.

Figure 5:
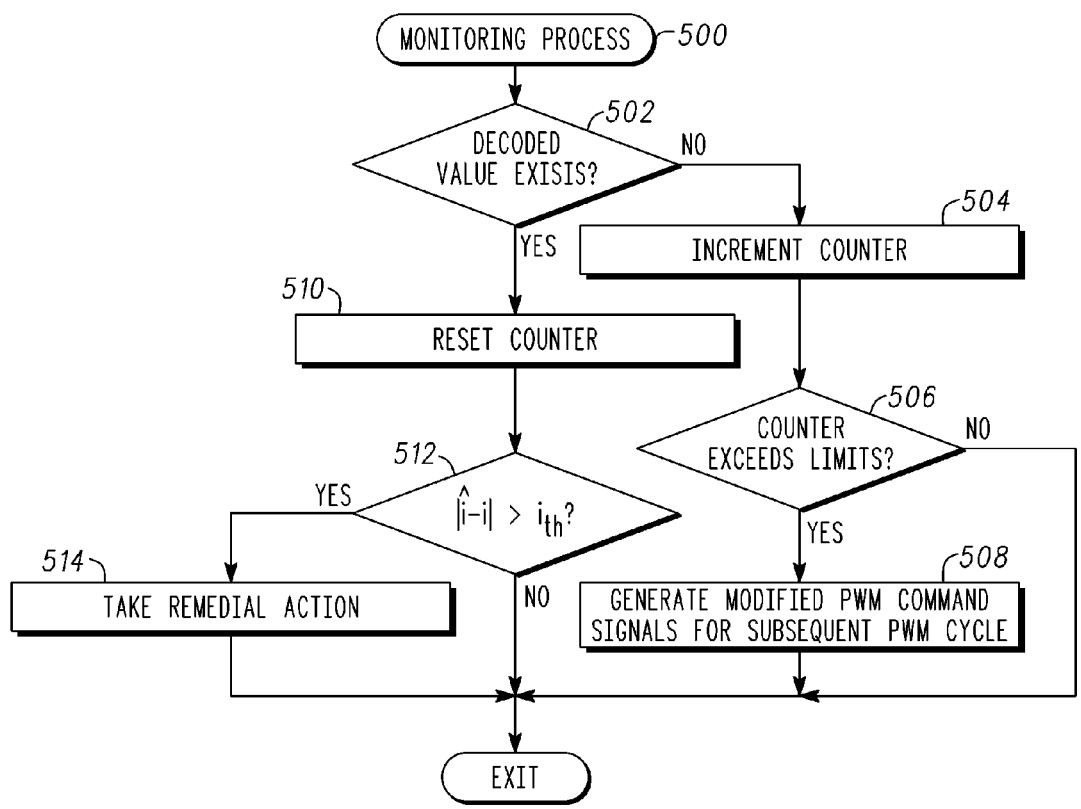
FIG. 5 is a flow diagram of a monitoring process suitable for use with the control process of FIG. 3 in accordance with one embodiment.

Referring now to FIG. 5, in an exemplary embodiment, an electrical system may be configured to perform a monitoring process 500 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the inverter module 104, the current sensors 110, 112, 114 and/or the control module 108, 200. It should be appreciated that any number of additional or alternative tasks may be included, and may be incorporated into a more comprehensive procedure or process having additional functionality not described in detail herein.

Referring to FIG. 5, and with continued reference to FIGS. 1-3, in an exemplary embodiment, the monitoring process 500 is performed to detect or otherwise identify an error condition (e.g., a fault condition or an error in one of the current sensors) when a difference between a measured value and an expected value for the particular current exceeds a threshold value. The threshold value is chosen such that a difference between a measured value and an expected value that is less than the threshold value indicates the current sensors are functioning within a desired tolerance of each other. For example, in accordance with one embodiment, the threshold value is equal to about five percent of the expected peak value for a motor phase current during operation of the electrical system. In an exemplary embodiment, the monitoring process 500 is performed for each measured current value (e.g., $i_A$, $i_B$, $i_C$, $i_Z$). In this regard, the monitoring process 500 may validate or otherwise verify the accuracy of each current sensor 112, 114 when the difference between a measured value and an expected value for the phase current corresponding to the respective current sensor current sensor 112, 114 is less than the threshold value.

The monitoring process 500 begins by determining whether a decoded value (or secondary value) exists for the particular current value (e.g., a motor phase current or zero vector current) being verified (task 502). As described above, a decoded value (or secondary value) for a particular current corresponds to a value for that particular current that is determined based upon a measured value for the DC current (e.g., task 308). In this regard, the control module 108, 200 and/or current verification block 206 determines whether a value corresponding to the respective current has been determined based on the measured values for the DC current (e.g., by decoding block 202) during the PWM cycle. In response to determining a decoded value for a particular current does exist, the monitoring process 500 resets a counter corresponding to that particular current (task 510).

In response to determining a decoded value for a particular current does not exist, the monitoring process 500 increments the counter corresponding to the respective current and determines whether the value of the counter exceeds a predetermined limit (tasks 504, 506). If the value of the counter exceeds the predetermined limit, the monitoring process 500 continues by generating modified PWM command signals for the phase legs of the inverter module for a subsequent PWM cycle that ensures a decoded value for the particular current will be obtained during the subsequent PWM cycle (task 508). In this regard, the predetermined limit is chosen such that a decoded value may be obtained for each particular current within a predetermined amount of time such that the measured values for each particular current can be verified at some minimum frequency. In an exemplary embodiment, the predetermined limit is chosen such that each current is capable of being verified at least every 10 milliseconds. The modified PWM command signals are chosen to result in one or more measured values for the DC current corresponding to the respective current while producing a net torque of zero (e.g., an effective zero vector being applied to the electric motor 106) during the subsequent PWM cycle.

For example, for the phase A motor current, the control module 108, 200 and/or current verification block 206 determines whether an expected value for the phase A motor current ($\hat{i}_A$) exists for the PWM cycle (task 502). If an expected value for the phase A motor current ($\hat{i}_A$) does not exist, the control module 108, 200 increments a counter until the counter exceeds the predetermined limit (tasks 504, 506). When the counter exceeds the predetermined limit, the control module 108, 200 generates PWM command signals for the inverter module 104 that result in an effective zero vector being applied to the electric motor 106 by applying voltage vector $V_1$ for a first duration during the subsequent PWM cycle and applying voltage vector $V_4$ for an equal duration during the subsequent PWM cycle. As a result, the control module 108, 200 may obtain at least one measured value of the DC current that corresponds to the phase A motor current while producing a net torque of zero during the subsequent PWM cycle.

In response to determining a decoded value for a particular current does exist, the monitoring process 500 continues by comparing the expected value for that particular current to the measured value for that particular current and determining whether the difference between the measured value and the expected value is greater than or equal to a threshold value (task 512). As described above, the threshold value is chosen such that a difference between the measured value and the expected value exceeding the threshold value is indicative of a current sensor error or a fault condition in the electrical system 100. When the difference between the measured value and the expected value is less than the threshold value, the measured value for the particular current is verified or otherwise validated and the monitoring process 500 exits. In response to determining the difference between the measured value and the decoded value exceeds the threshold value, the monitoring process 500 continues by taking a remedial action (task 514). In this regard, the control module 108, 200 initiates one or more remedial actions, as described above (e.g., task 316).

For example, for the phase A motor current, the control module 108, 200 and/or current verification block 206 determines whether the difference between the expected value for the phase A motor current ($\hat{i}_A$) and the measured value for the phase A motor current ($i_A$) exceeds the threshold value (task 512). If the difference between the expected value for the phase A motor current ($\hat{i}_A$) and the measured value for the phase A motor current ($i_A$) is less than the threshold value, the measured value for the phase A motor current ($i_A$) is verified, and thus, the operation of the current sensor 112 corresponding to phase A of the motor 106 is also verified or otherwise validated. The monitoring process 500 may then repeat for each of the remaining currents, for example, the phase B motor current, the phase C motor current, and the zero vector current.

One advantage of the systems and/or methods described above is that two phase current sensors are used to provide current-based control of the electric motor while a DC current sensor is used to verify and/or validate the accuracy of the two phase current sensors and detect other fault conditions in the electrical system. As a result, unintended motor torque may be prevented or otherwise detected reasonably quickly (e.g., within a PWM cycle or within a predetermined time limit). Additionally, the erroneous phase current sensor may be identified. For example, if the difference between measured values and expected values is greater than the threshold value for the phase A current but is less than the threshold value for the phase B current and the zero vector current, it may be determined that the phase A current sensor (e.g., sensor 112) is not functioning properly.

Figure 6:
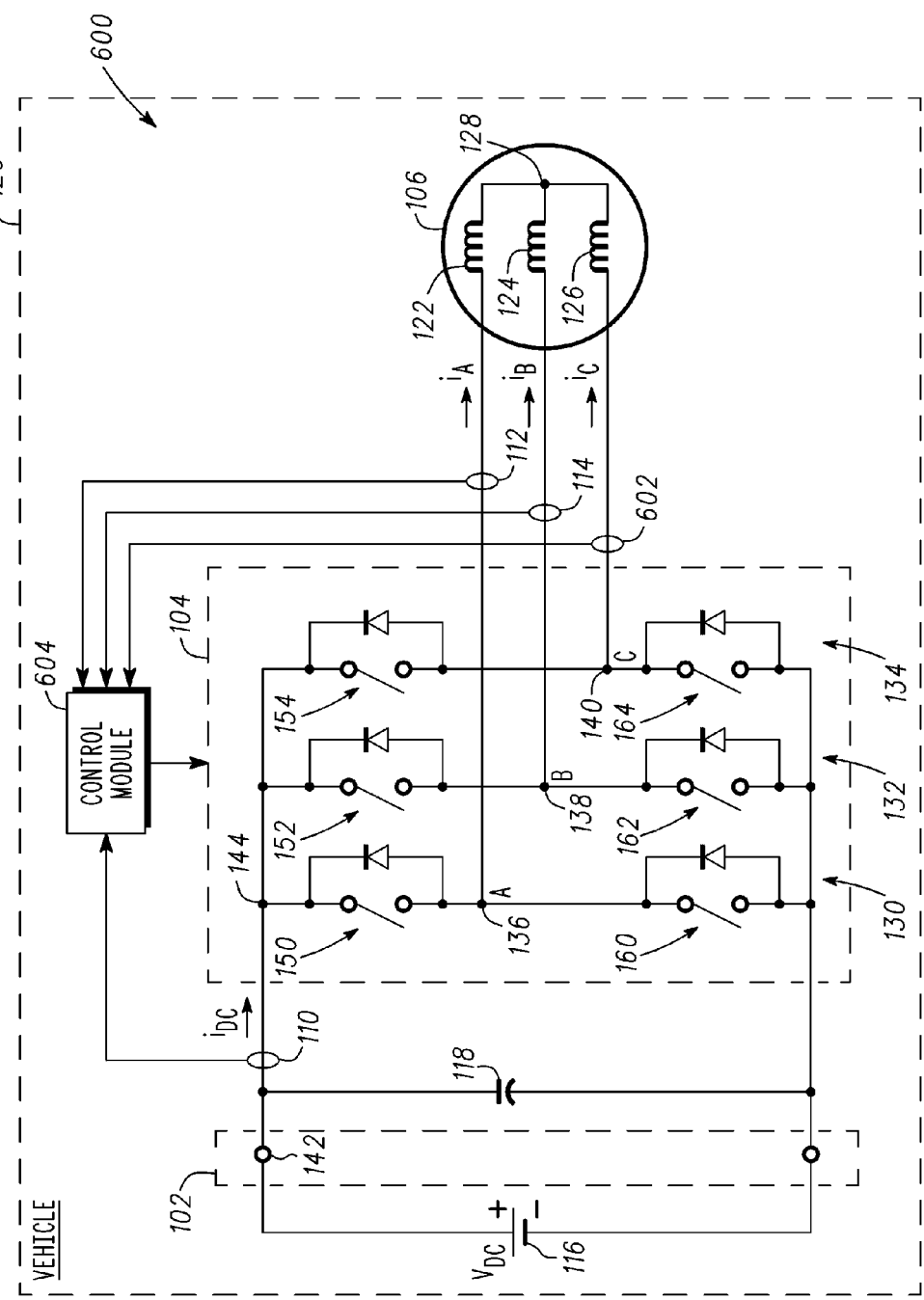
FIG. 6 is a schematic view of an electrical system suitable for implementing the control process of FIG. 3 in accordance with another embodiment.

FIG. 6 depicts another embodiment of an electrical system 600 suitable for implementing the control process 300. The electrical system 600 includes a third phase current sensor 602 interposed or otherwise arranged between node 140 of phase leg 134 and winding 126. In this regard, the third phase current sensor 602 measures the phase C motor current ($i_C$). The control module 604 of FIG. 6 is configured to obtain the measured value for the phase C motor current ($i_C$) from the phase current sensor 602, and thus, the control module 604 need not include a current calculation block 204 as described above.

Because only two phase current sensors are needed for current-based control of the electric motor 106, the embodiment of FIG. 6 adds redundancy to the electrical system 100 in the event of an error in one of the phase current sensors 112, 114, 602. In response to detecting an error condition, the control module 604 may identify the erroneous current sensor and modify the control scheme to utilize only the verified (or validated current sensors). For example, if the difference between the expected value for the phase A motor current ($\hat{i}_A$) and the measured value for the phase A motor current ($i_A$) is greater than the threshold value, the control module 604 may determine that the values obtained from the current sensor 112 corresponding to phase A of the motor 106 are not valid (e.g., an error condition exists in current sensor 112), and as a remedial action, the control module 604 may modify the control scheme being used to control the motor 106 to utilize only the currents measured by current sensors 114 and 602 to determine PWM command signals for the inverter module 104 (e.g., task 302).

Additionally, the embodiment of FIG. 6 allows the control module 604 to determine or otherwise identify when the DC current sensor 110 is no longer measuring current accurately. As described above, the sum of the measured phase currents for the motor is substantially equal to zero. In this regard, if the difference between measured values and expected values is greater than the threshold value for each of the phase currents and the zero vector current, but the sum of the measured phase currents for the motor obtained from the current sensors 112, 114, 602 is less than the threshold value, the control module 604 may identify or otherwise determine the DC current sensor 110 is the source of the error condition and is no longer functioning properly. In this situation, the control module 604 may take remedial action by generating an indication of the DC current sensor 110 error but maintain normal current-controlled operation of the electric motor 106 and using the sum of the measured phase currents for the motor obtained from the current sensors 112, 114, 602 to detect or identify a fault condition in a conventional manner.

Figure 7:
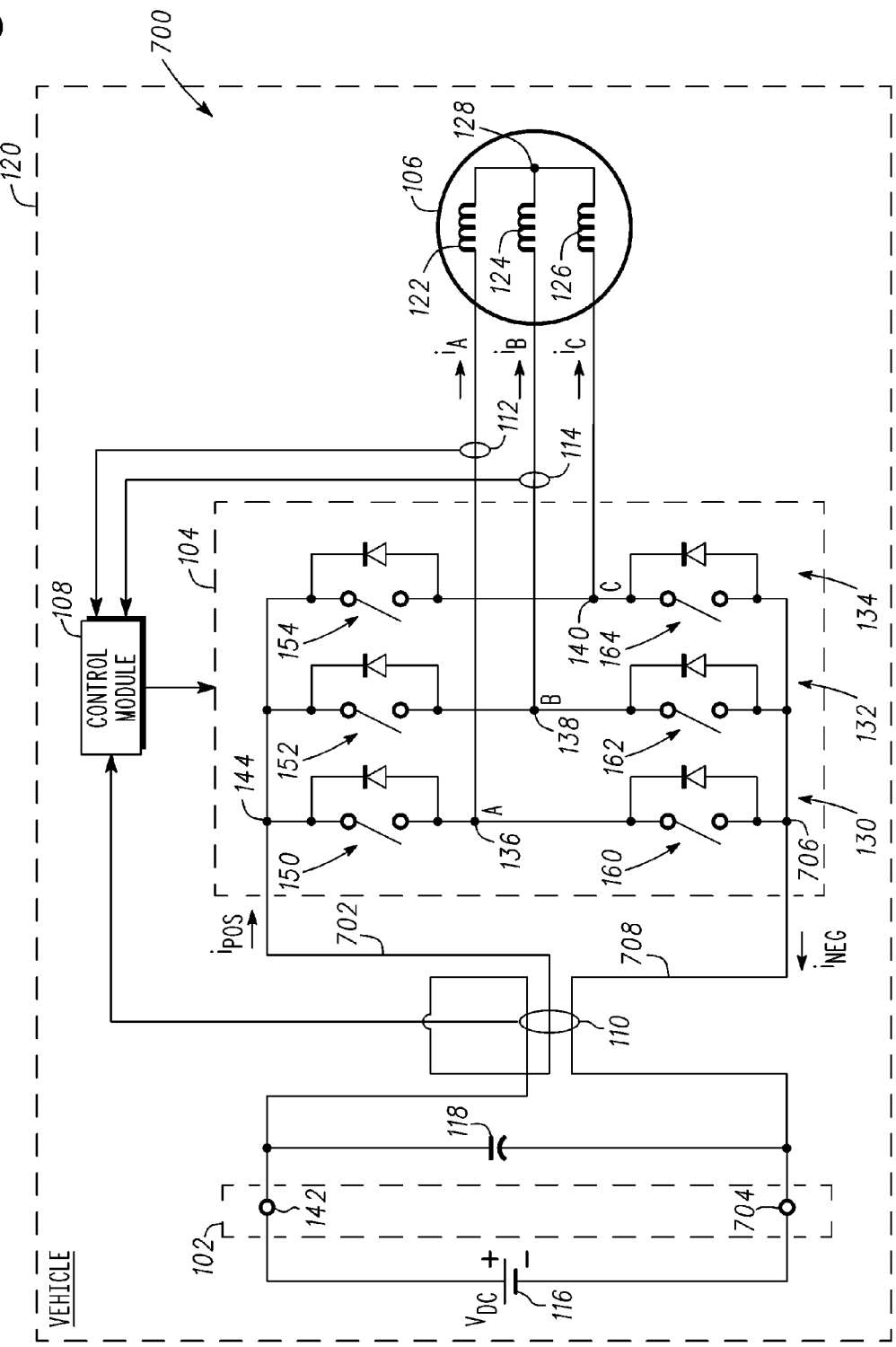
FIG. 7 is a schematic view of an electrical system suitable for implementing the control process of FIG. 3 in accordance with yet another embodiment.

FIG. 7 depicts another embodiment of an electrical system 700 suitable for implementing the control process 300. In the illustrated embodiment, the connection mechanism 702 (e.g., wire, cable, or the like) that provides the electrical connection between node 142 of the DC interface 102 and node 144 of the inverter module 104 is fed through the DC current sensor 110 and then wrapped around and fed through the DC current sensor 110 in the same direction a second time, such that the current between node 142 and node 144 ($i_{POS}$) flows through and is measured and/or sensed by the DC current sensor twice. The connection mechanism 708 that provides the electrical connection between node 704 of the DC interface 102 and node 706 of the inverter module 104 is fed through the DC current sensor 110, such that the DC current sensor 110 also measures the current between node 706 and node 704 ($i_{NEG}$). Thus, by virtue of the configuration shown in FIG. 7, the measured value of the DC current from node 142 of the DC interface 102 to the inverter module 104 is equal to twice the current between node 142 and node 144 minus the current between node 706 and node 704 (e.g., $i_{DC}=2i_{POS}-i_{NEG}$). In the absence of a fault condition, the current between node 142 and node 144 ($i_{POS}$) and the current between node 706 and node 704 ($i_{NEG}$) are equal and cancel out, such that the measured value of the DC current obtained from DC current sensor 110 is substantially equal to the current between node 142 and node 144 as described above (e.g., $i_{DC}=i_{POS}$). One advantage of the embodiment of FIG. 7 is that the electrical system 700 is capable of detecting isolation fault conditions (or isolation-type fault conditions) that may be detectable based on the current between node 706 and node 704 ($i_{NEG}$) (or a difference between the current between node 706 and node 704 and the current between node 142 and node 144) that may not otherwise be detectable based on solely measuring one DC current between the DC interface 102 and the inverter module 104 (e.g., the current between node 142 and node 144 ($i_{POS}$) only).

For the sake of brevity, conventional techniques related to electrical energy and/or power conversion, power inverters, pulse-width modulation, current sensing and/or sampling, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle comprising:
a direct current (DC) interface;
an electric motor having a plurality of phases;
an inverter module coupled between the DC interface and the electric motor, the inverter module comprising a plurality of phase legs, wherein each phase leg corresponds to a respective phase of the electric motor;
a first current sensor configured to measure a DC current flowing between the DC interface and the inverter module;
a second current sensor interposed between a first phase leg of the inverter module and a first phase of the electric motor, the second current sensor configured to measure a first phase current flowing through the first phase of the electric motor; and
a control module coupled to the first current sensor and the second current sensor, wherein the control module is configured to:
determine an expected value for the first phase current based at least in part on the DC current measured by the first current sensor; and
take remedial action when a difference between the expected value for the first phase current and the measured first phase current is greater than a threshold value.

2. The electrical system of claim 1, the control module being coupled to the inverter module, wherein the control module is configured to:
generate command signals to operate the plurality of phase legs of the inverter module for a switching interval; and
determine the expected value for the first phase current based on the DC current measured by the first current sensor during the switching interval and the command signals for the switching interval.

3. The electrical system of claim 2, wherein the control module generates the command signals in a manner that is influenced by a difference between the measured first phase current and a current command for the first phase of the electric motor.

4. The electrical system of claim 2, further comprising a third current sensor interposed between a second phase leg of the inverter module and a second phase of the electric motor, the third current sensor being configured to measure a second phase current flowing through the second phase of the electric motor.

5. The electrical system of claim 4, wherein the control module coupled to the third current sensor and configured to:
determine an expected value for the second phase current based at least in part on the DC current measured by the third current sensor; and
take remedial action when a difference between the expected value for the second phase current and the measured second phase current is greater than the threshold value.

6. The electrical system of claim 5, wherein the control module is configured to:
generate command signals to operate the plurality of phase legs of the inverter module for the switching interval based at least in part on the measured first phase current and the measured second phase current; and determine the expected value for the second phase current based on the DC current measured by the first current sensor during the switching interval and the command signals for the switching interval.

7. The electrical system of claim 4, further comprising a fourth current sensor interposed between a third phase leg of the inverter module and a third phase of the electric motor, the fourth current sensor being configured to measure a third phase current flowing through the third phase of the electric motor.

8. The electrical system of claim 7, the control module being coupled to the fourth current sensor, wherein in response to determining the difference between the expected value for the first phase current and the measured first phase current is greater than the threshold value, the control module is configured to take remedial action by generating command signals to operate the plurality of phase legs of the inverter module for the switching interval based on the measured second phase current and the measured third phase current.

9. The electrical system of claim 1, wherein the control module is configured to:
determine a zero vector current based at least in part on the DC current measured by the first current sensor; and
take remedial action when the zero vector current is greater than the threshold value.

10. The electrical system of claim 9, further comprising:
a first connection mechanism coupled between a first node of the DC interface and a first node of the inverter module; and
a second connection mechanism coupled between a second node of the DC interface and a second node of the inverter module, wherein the first connection mechanism is fed through the first current sensor twice and the second connection mechanism is fed through the first current sensor once, wherein current through the first connection mechanism and current through the second connection mechanism flow in opposite directions.

11. A method for operating an electrical system including an inverter coupled between a direct current (DC) interface and an electric motor, the method comprising:
measuring DC current flowing between the DC interface and the inverter;
measuring a first phase current flowing between the inverter and a first phase of the electric motor;
determining an expected first phase current based on the measured DC current; and
taking remedial action when a difference between the measured first phase current and the expected first phase current is greater than a threshold value.

12. The method of claim 11, the measured DC current being obtained when a voltage vector corresponding to the first phase of the electric motor is applied to the electric motor by the inverter, wherein determining the expected first phase current comprises mapping the measured DC current to the first phase of the electric motor based on the voltage vector.

13. The method of claim 11, further comprising:
measuring a second phase current flowing between the inverter and a second phase of the electric motor; and
generating command signals for the inverter based at least in part on the measured first phase current and the measured second phase current, the command signals being configured to produce a commanded torque in the electric motor.

14. The method of claim 13, further comprising measuring a third phase current flowing between the inverter and a third phase of the electric motor, wherein taking remedial action comprises generating the command signals for the inverter based on the measured second phase current and the measured third phase current.

15. The method of claim 13, wherein determining the expected first phase current comprises determining the expected first phase current based on the measured DC current and the command signals for the inverter.

16. The method of claim 11, further comprising:
determining a zero vector current based on the measured DC current; and
taking remedial action when the zero vector current is greater than a second threshold value.

17. An electrical system comprising:
a direct current (DC) interface;
an electric motor having a plurality of phases;
an inverter module coupled between the DC interface and the electric motor, the inverter module comprising a plurality of phase legs wherein each phase leg corresponds to a phase of the electric motor;
a first current sensor interposed between the DC interface and the inverter module, the first current sensor being configured to measure a DC current flowing between the DC interface to the inverter module;
a second current sensor interposed between a first phase leg of the inverter module and a first phase of the electric motor, the second current sensor being configured to measure a first phase current flowing through the first phase of the electric motor;
a third current sensor interposed between a second phase leg of the inverter module and a second phase of the electric motor, the third current sensor being configured to measure a second phase current flowing through the second phase of the electric motor; and
a control module coupled to the first current sensor, the second current sensor and the inverter module to:
generate command signals to operate the plurality of phase legs of the inverter module for a switching interval based on the first phase current and the second phase current, the command signals for the switching interval resulting in a voltage vector corresponding to a first phase of the electric motor being implemented by the inverter module during the switching interval;
determine an expected first phase current based on the DC current measured by the first current sensor during the switching interval and the command signals for the switching interval by mapping the DC current measured by the first current sensor during the voltage vector to the first phase; and
take remedial action when a difference between a measured first phase current from the second current sensor and the expected first phase current is greater than a threshold value.

18. A method for operating an electrical system including an inverter coupled between a direct current (DC) interface and an electric motor, the method comprising:
measuring DC current flowing between the DC interface and the inverter;
measuring a first phase current flowing between the inverter and a first phase of the electric motor;
determining an expected first phase current based on the measured DC current;
determining a zero vector current based on the measured DC current; and
taking remedial action when a difference between the measured first phase current and the expected first phase current is greater than a threshold value or when the zero vector current is greater than a second threshold value.

19. An electrical system for use in a vehicle comprising:
a direct current (DC) interface;
an electric motor having a plurality of phases;
an inverter module coupled between the DC interface and the electric motor, the inverter module comprising a plurality of phase legs, wherein each phase leg corresponds to a respective phase of the electric motor;
a first current sensor configured to measure a DC current flowing between the DC interface and the inverter module;
a second current sensor interposed between a first phase leg of the inverter module and a first phase of the electric motor, the second current sensor configured to measure a first phase current flowing through the first phase of the electric motor; and
a control module coupled to the first current sensor and the second current sensor, wherein the control module is configured to:
determine a zero vector current based at least in part on the DC current measured by the first current sensor; and
take remedial action when the zero vector current is greater than the threshold value.

* * * * *